United States Patent
Zheng

[19]

[11] Patent Number: 5,886,980
[45] Date of Patent: Mar. 23, 1999

[54] BIT STREAM BASED CONNECTION ADMISSION CONTROL SYSTEM

[75] Inventor: Qin Zheng, Boxborough, Mass.

[73] Assignee: Mitsubishi Electric Information Technology Center America, Inc., Cambridge, Mass.

[21] Appl. No.: 702,741

[22] Filed: Aug. 23, 1996

[51] Int. Cl.⁶ .............................. H04J 1/16; H04J 3/14
[52] U.S. Cl. ............................. 370/230; 370/412
[58] Field of Search ................... 370/229, 230, 370/231–234, 235, 236, 252, 412, 395

[56] References Cited

U.S. PATENT DOCUMENTS

| | | | |
|---|---|---|---|
| 4,984,264 | 1/1991 | Katsube | 370/231 |
| 5,050,161 | 9/1991 | Godestani | 370/412 |
| 5,267,232 | 11/1993 | Katsube et al. | 370/230 |
| 5,274,644 | 12/1993 | Berger et al. | 370/230 |
| 5,392,280 | 2/1995 | Zheng | 370/231 |

*Primary Examiner*—Ajit Patel
*Attorney, Agent, or Firm*—Dirk Brinkman

[57] ABSTRACT

In a cell switched network such as an ATM network, a connection admission control system is provided to establish connections which guarantee user requested end-to-end cell transmission delay bounds. The subject system uses, a bit stream approach to model the worst case cell generation pattern of a connection and provides mechanisms to construct new bit streams after the original ones are delayed, multiplexed, demultiplexed, or filtered within a network. Given arriving bit streams at a queueing point, a system is provided to obtain the worst-case cell queueing delay which is used to check if a connection can be established with the requested delay bounds. In one embodiment, the subject system uses the CBR/VBR traffic models as defined in the ATM Forum Traffic Management Specification Version 4.0 to derive the worst-case bit stream for a connection and calculates the worst case queueing delay based on the conventional static priority First In First Out, or FIFO, cell transmission scheduling at switches. The subject invention provides a simple and efficient way to support real-time CBR/VBR services as defined by the ATM Forum over existing ATM networks without requiring a sophisticated cell transmission scheduling mechanism at switches.

4 Claims, 8 Drawing Sheets

BIT STREAM BASED CONNECTION ADMISSION CONTROL SYSTEM

FIELD OF THE INVENTION

This invention relates to connection admission control in a digital communication network and more particularly to a system which uses a bit stream approach based on a worst case cell generation scenario to establish real time CBR/VBR connections in an ATM network with conventional static priority FIFO switches.

BACKGROUND OF THE INVENTION

Asynchronous Transfer Mode (ATM) is a cell switched technology for transferring data over high speed digital communication networks. Unlike Synchronous Transfer Mode (STM) used in today's telecommunication networks, which uses static time division multiplexing to carry multiple connections over a physical transmission link, ATM allows data cells of multiple connections to dynamically share time slots of a transmission link. This dynamic sharing of transmission bandwidth increases a network's efficiency in carrying variable bandwidth traffic, but it also makes it difficult to provide guaranteed quality of service, or QoS, to connections due to contention from multiple connections for the same transmission bandwidth. One commonly used QoS measurement is the end-to-end cell transmission delay. To provide this type of QoS guarantee, a connection must transfer all cells generated at a source to a destination within a user requested delay bound. End to end cell transmission delay bound is usually needed for transferring real-time traffic, such as interactive audio/video signals, over a network.

One way of providing guaranteed QoS communication in an ATM network is to use the Constant Bit Rate, or CBR, service. The CBR service is provided via rate control at sources which limits the maximum rate that data cells can be injected into a network for a connection, and connection admission control (CAC) using peak bandwidth allocation to limit the aggregated bandwidth of all CBR connections over a transmission link not to exceed the link bandwidth. However, rate control and peak bandwidth allocation alone can not automatically guarantee QoS for CBR connections due to traffic distortions within a network. Specifically, due to cell jitter introduced at upstream nodes, cells of a CBR connection may arrive at a switching node in a network at a higher rate than they are generated at the source for a certain period of time. This fluctuation in cell rates may cause aggregated cell rate exceed the link bandwidth, resulting in unpredictable queueing delays for CBR cells. To provide guaranteed QoS for CBR connections, more sophisticated CAC mechanisms than peak bandwidth allocation are needed to calculate worst-case queueing delays for CBR connections and make sure that the worst-case delays do not exceed the delay bounds requested by applications.

In addition, CBR is not always a suitable service for providing real-time communication. Real-time traffic such as encoded video signal has variable bandwidth. It causes over-reservation of network resources if one assigns a connection with a bandwidth equal to the peak rate of the traffic. The Variable Bit Rate (VBR) service as defined by the ATM Forum is more suitable for bursty real-time traffic. The traffic model for a VBR connection is described by a peak cell rate (PCR), a sustainable cell rate (SCR), and a maximum bursty size (MBS). A VBR connection is allowed to inject up to MBS cells into a network at a rate of PCR under a constraint that the average cell rate does not exceed SCR. In other words, a connection is allowed to generate traffic at a higher rate for a certain period of time if it did not use up the average bandwidth allocated to it. The VBR service can support bursty real-time communication better than the CBR service. However, no good CAC mechanisms are known so far to provide hard real-time guarantees for VBR connections. A more detailed description of the CBR/VBR services can be found in a document entitled "ATM Forum Traffic Management Specification Version 4.0" authored by the ATM Forum, April 1995.

In the subject invention, we introduce a bit-stream traffic model to describe the worst-case traffic pattern of a CBR or VBR connection and a mechanism to obtain the worst-case queueing delay based on the model. This worst-case queueing delay is then used for connection admission control.

SUMMARY OF INVENTION

The subject invention provides a way to obtain the absolute worst-case queueing delays for CBR or VBR connections by taking into account of traffic distortions within a network. It can be used to establish both hard real-time connections with bounded worst-case delays and soft real-time connections for which occasional misses of cell deadlines are acceptable.

The subject system uses a bit stream traffic model to describe the worst-case traffic pattern for each connection and provides mechanisms to construct altered bit streams after the original ones are delayed, multiplexed, demultiplexed, or filtered within a network. These bit streams are then used to obtain the worst-case cell queueing delays at each queueing point within a network and to check if a connection can be established with the requested delay bound guarantee.

Specifically, in a cell switched network such as an ATM network, a connection admission control system is provided to establish connections which guarantee user requested end-to-end cell transmission delay bounds. The subject system uses a specially designed bit stream approach to model the worst case cell generation pattern of a connection and provides mechanisms to construct new bit streams after the original ones are delayed, multiplexed, demultiplexed, or filtered within a network. Given arriving bit streams at a queueing point, a system is provided to obtain the worst-case cell queueing delay which is used to check if a connection can be established with the requested delay bounds. In one embodiment, the subject system uses the CBR/VBR traffic models as defined in the ATM Forum Traffic Management Specification Version 4.0 to derive the worst-case bit stream for a connection and calculates the worst case queueing delay based on the conventional static priority First In First Out, or FIFO, cell transmission scheduling at switches.

The subject invention thus provides a simple and efficient way to support real-time CBR/VBR services as defined by the ATM Forum over existing ATM networks without requiring a sophisticated cell queueing and transmission scheduling mechanism at switches.

BRIEF DESCRIPTION OF DRAWINGS

These and other features of the Subject Invention will be better understood in conjunction with the Detailed Description taken in accordance with the Drawings of which.

DETAILED DESCRIPTION

Figure 1:
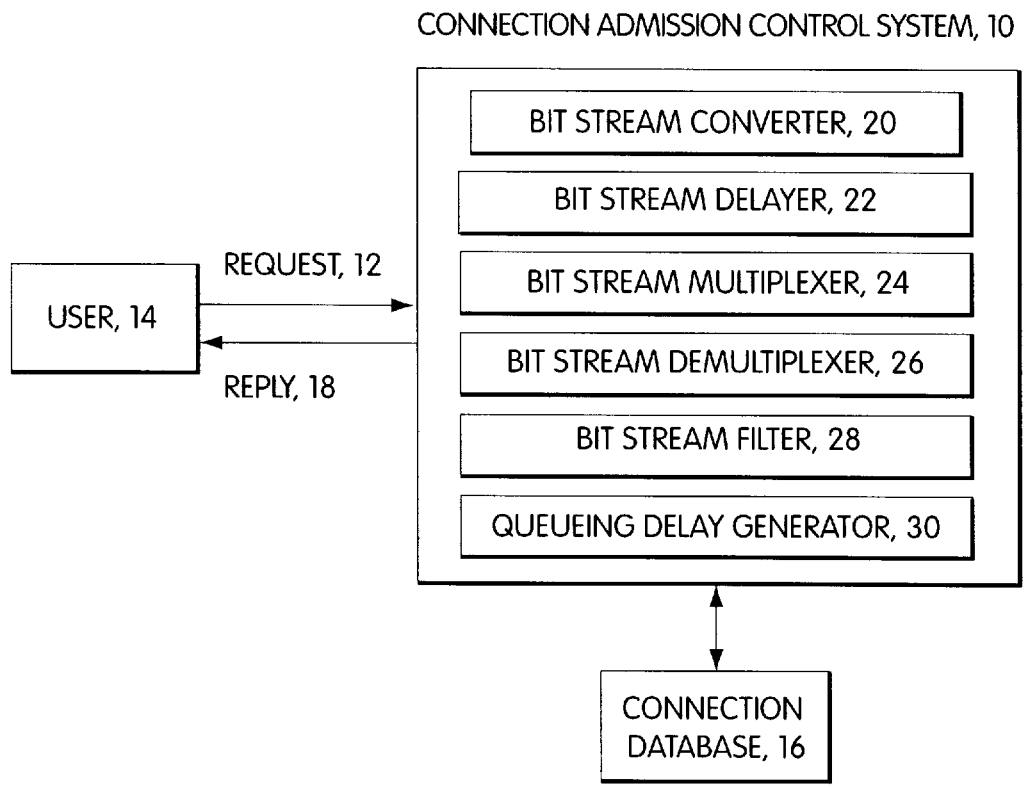
FIG. 1 is a schematic diagram illustrating the usage of a connection admission control system for processing a connection setup request from a network user.

Referring now to FIG. 1, a connection admission control system 10 is used to process a connection setup request 12 from a network user 14. Based on the connection information contained in request 12 and the current network load condition stored in a connection database 16, connection admission control system 10 determines whether or not the requested connection can be accepted and notifies user 12 via a reply 18. Connection admission control system 10 is composed of a bit stream converter 20, a bit stream delayer 22, a bit stream multiplexer 24, a bit stream demultiplexer 26, a bit stream filter 28, and a queueing delay generator 30. Operations of each block will be explained in the following figures. If the connection is admitted, connection database 16 is updated to include the information about the new connection and user 12 can start sending cells after receiving reply 18 from connection admission control system 10. Otherwise, reply 18 contains a connection reject message and user 12 must submit a connection setup request again in order to send cells over the network.

Figure 2:
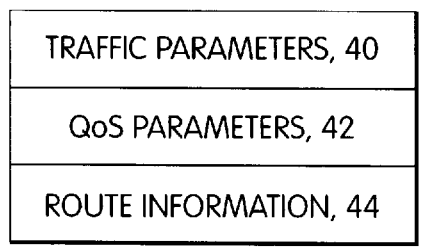
FIG. 2 is a schematic diagram illustrating major contents contained in a connection setup request.

Referring now to FIG. 2, connection setup request 12 in FIG. 1 contains traffic parameters 40, QoS parameters 42, and route information 44. Traffic parameters 40 describe how fast a user wishes to send cells over the requested connection. This information helps a connection admission control system to determine the worst-case traffic generation pattern of the connection and how much network resource is needed for this connection. QoS parameters indicate the quality of service that a user requests over the connection. One common QoS parameter is the end to end queueing delay bound D. Specifically, an admitted connection is guaranteed that cells transmitted over the connection will not experience an end-to-end queueing delay larger than its requested bound D. A bounded queueing delay enables the provision of a bounded end to end cell transmission delay. Route information 44 indicates over which switches and links that the connection is to be setup.

Figure 3:
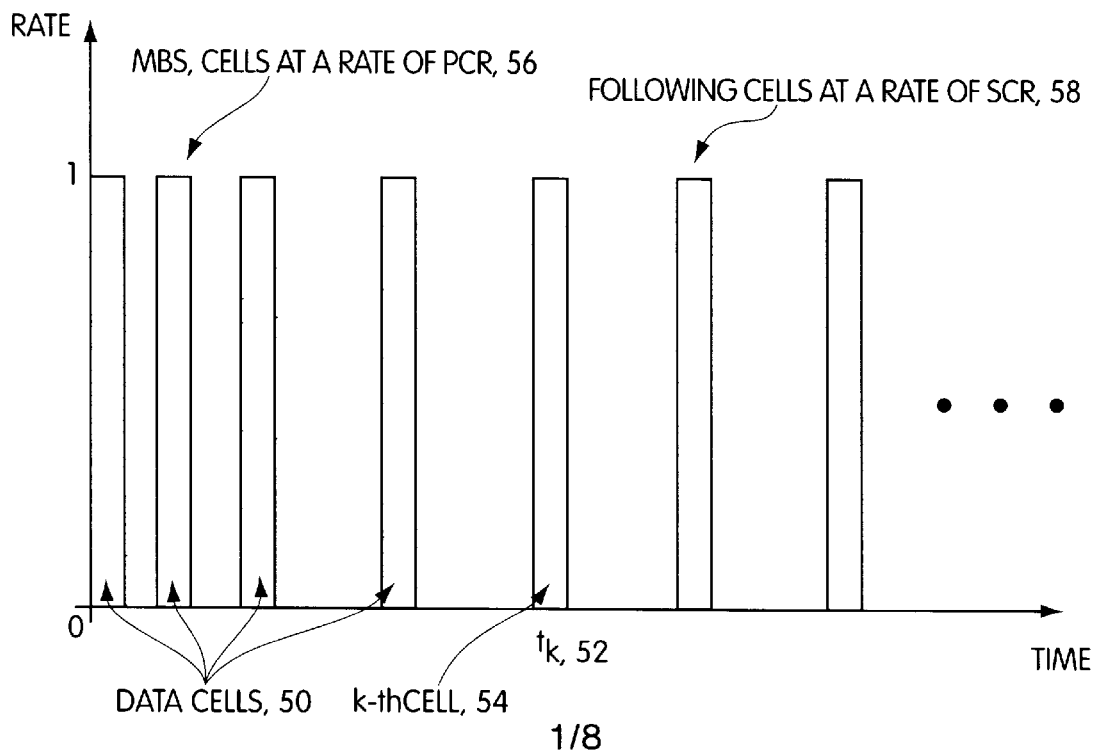
FIG. 3 is a schematic diagram illustrating the worst-case cell generation pattern of a VBR connection.

Referring now to FIG. 3, traffic parameters for a VBR connection include a peak cell rate, or PCR, in a unit of cells per cell time, with one cell time being defined as the time needed to transmit a cell at the full link bandwidth, a sustainable cell rate, or SCR, in a unit of cells per cell time, and a maximum burst size, or MBS, in a unit of cells. Data cells 50 generated by a VBR connection must satisfy the VBR traffic model. Specifically, let $t_k$ 52 be the time when the k-th cell 54 is generated, then tk must satisfy the follow inequality:

$$t_k \geq \begin{cases} t_{k-1} + 1/PCR & \text{if } C_k \geq 1 \\ t_{k-1} + 1/SCR & \text{if } C_k < 1 \end{cases} \quad (1)$$

where $C_k$ is updated as $$C_k = \max\{MBS, C_{k-1} + (t_k - t_{k-1})*SCR - 1\}$$

The physical meaning of the above traffic model is that $C_k$ represents the number of tokens that a VBR connection possesses which is decremented by one each time a cell is sent and incremented at a rate of SCR up to a maximum value of MBS. A connection is allowed to generate cells at a rate of PCR whenever $C_k \geq 1$. Otherwise, the cell generation rate is constrained by the rate at which the token is incremented, i.e., SCR. With this traffic model, a connection is allowed to generated a burst of up to MBS cells at a rate of PCR as long as it does not exceed an average transmission rate of SCR. A traffic shaper is usually used in a source system to ensure that a VBR connection does not generate more cells than that allowed by the above traffic model.

The worst case traffic generation pattern during a time period [0,t] is defined as the one in which the maximum number of cells are generated during this period of time. FIG. 3 shows the worst-case traffic generation pattern of a VBR connection where MBS cells 56 are generated at a rate of PCR and all following cells 58 are generated at a rate of SCR.

A CBR connection is described by a peak cell rate PCR which controls the maximum rate that cells can be generated. Since a CBR connection can be viewed as a VBR connection with SCR=PCR, it can be treated as a special case of VBR.

Figure 4:
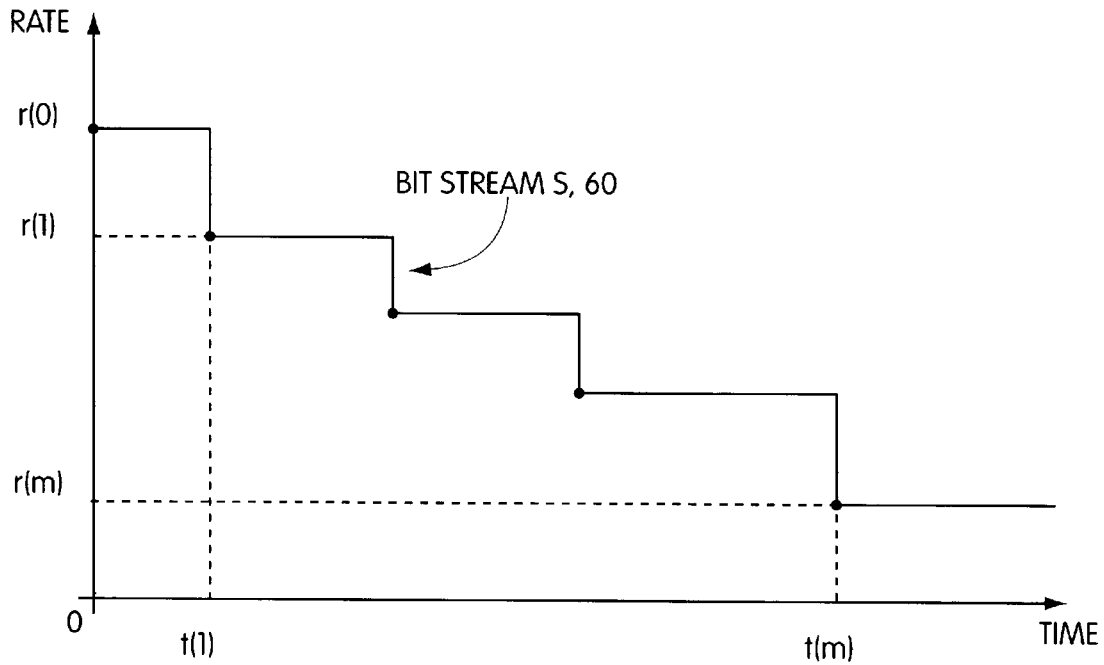
FIG. 4 is a schematic diagram illustrating a bit stream S used to describe a cell stream generated by connections.

Referring now to FIG. 4, to perform worst case queueing analysis, a bit-stream traffic model 60 is used to describe the worst-case traffic pattern of a VBR connection. Specifically, a bit stream S is described by S={(r(k),t(k)), k=0,1, . . . , m} which represents the bit rate r as a monotony decreasing step-wise function of time t as shown in FIG. 4. More specifically, S represents a bit stream which has a rate r(k) during a time interval [t(k), t(k+1)) with t(0)=0 and t(m+1)=∞.

Figure 5:
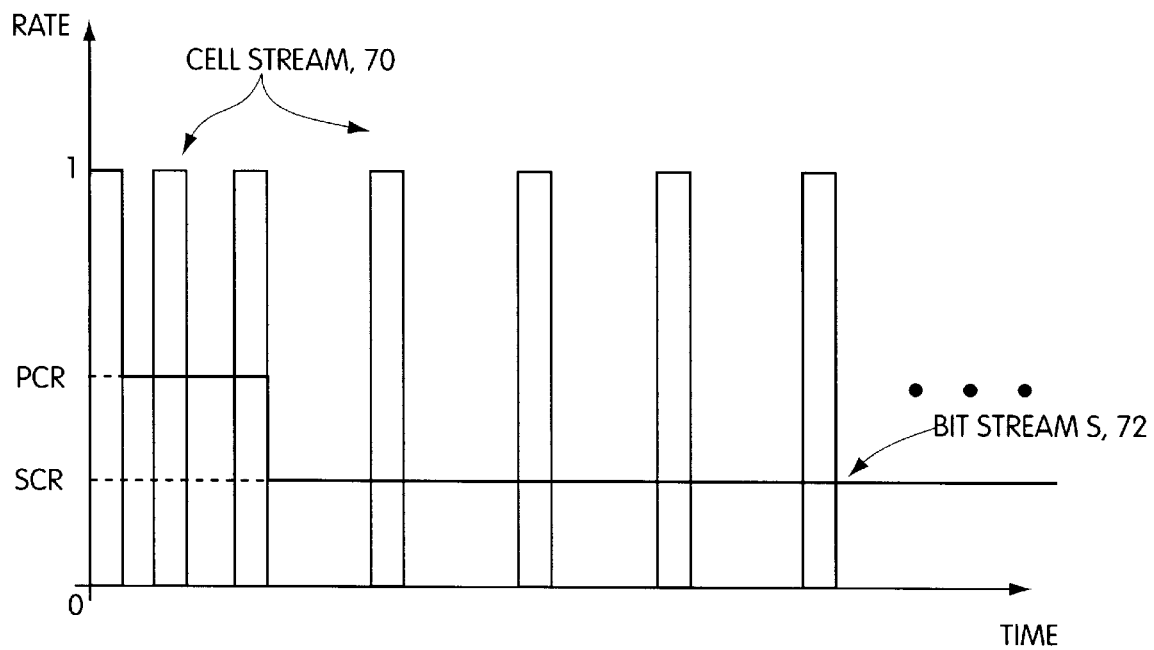
FIG. 5 is a schematic diagram illustrating the worst-case bit stream generated by a VBR connection.

Referring now to FIG. 5, the conversion from a discrete cell stream 70 to a continuous bit stream 72 for a VBR connection is performed by a bit stream converter 22 as illustrated in FIG. 1. Specifically, bit stream converter 22 converts a VBR traffic model (PCR, SCR, MBS) into a bit stream S={(1,0), (PCR, 1), (SCR, 1+(MBS−1)/PCR)}.

It can be seen from FIG. 5 that the converted bit stream 72 approximates cell stream 70 in such a way that bit stream 72 generates the same number of bits as that of cell stream 70 at cell boundaries. Usage of bit streams simplifies queueing analysis that needs to be performed by a connection admission control system.

When a bit stream passes through a network, it may be delayed, multiplexed and demultiplexed with other bit streams, and filtered by transmission links. FIGS. 6–9 show the operations of mechanisms illustrated in FIG. 1 for manipulating bit streams.

Figure 6:
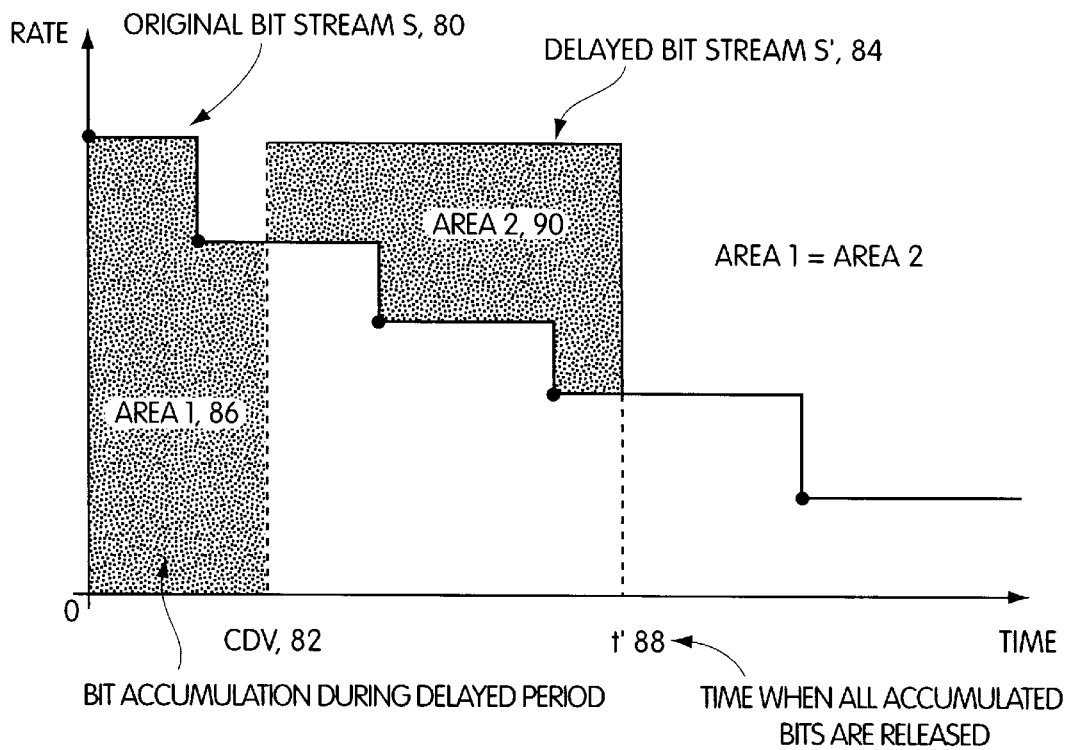
FIG. 6 is a schematic diagram illustrating a delayed bit stream.

Referring now to FIG. 6, passing a bit stream 80 through a network with a delay variance of CDV 82 can cause clumping of bits. In the worst case, all bits generated during a time period [0,CDV] can be delayed until time CDV and then released at a full link rate, changing the original bit stream S 80 to a delayed bit stream S' 84 as shown in the figure.

The conversion from an original stream S={((r(k),t(k)), k=0, . . . , m} to a delayed stream S'={((r'(k), t'(k)), k=0, . . . , m'} is performed by a bit stream delayer 24 as illustrated in FIG. 1 with the following steps:

Step 1: Calculate bit accumulation during the delayed period [0,CDV] as shown by AREA1 86.

Step 2: Calculate time t' 88 when all accumulated bits are release, i.e., when AREA2 90 equals to AREA1 86 as shown in FIG. 6.

Step 3: Construct a delayed bit stream S' 84 which has a bit rate r'(t)=1 during time period [0, t'-CDV), and bit rate r'(t)=r(t+CDV) for t≧t'-CDV.

The following Pseudo code gives an example implementation of the above bit stream conversion steps.

Passing a bit stream S={((r(k),t(k)), k=0, . . . , m} through one or more queueing points which have an accumulated maximum delay variation of CDV results in a worst-case delayed bit stream S'={((r'(k), t'(k)), k=0, . . . , m'} which can be calculated as follows:

```
AREA1 = 0
AREA2 = 0
k = 0                        /* index variable for bit, stream S */
k' = 1                       /* index variable for bit stream S' */
/* Step 1: calculation of bit accumulation due to CDV */
while (t(k + 1) < CDV)
AREA1 = AREA1 + r(k)*(t(k + 1)-t(k))
k = k + 1
AREA1 = AREA1 + r(k)*(CDV-t(k))
/* Step 2: calculation of t' */
AREA2 = (1 - r(k))*(t(k + 1)-CDV)
while (AREA1 > AREA2)
k = k + 1
AREA2 = AREA2 + (1 - r(k))*(t(k + 1)-t(k)).
t' = t(k + 1)-(AREA2 - AREA1)/(1 - r(k))
/* Step 3: construction of S' */
t' (0) = 0
r' (0) = 1
t' (1) = t'-CDV
r' (k') = r(k)
while (k < m)
k = k + 1
k' = k' + 1
t' (k') = t(k)-CDV
r' (k') = r(k)
```

Figure 7:
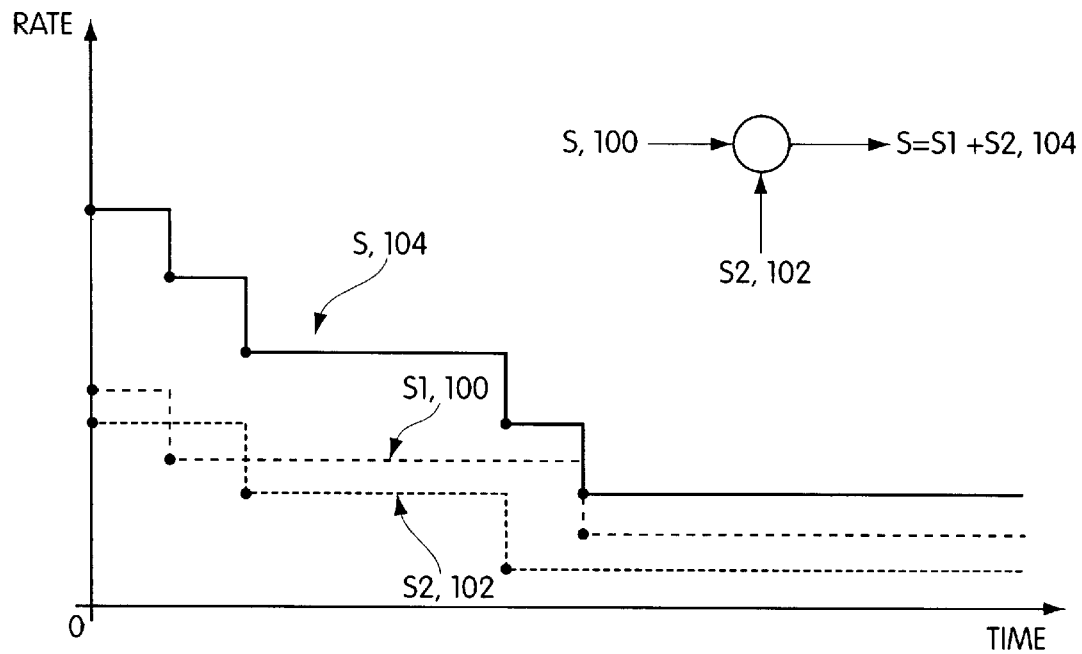
FIG. 7 is a schematic diagram illustrating multiplexing of two bit streams.

Referring now to FIG. 7, suppose two bit streams S1 100 and S2 102 arrive at a queueing point, then the rate of the multiplexed bit stream S 104 can be obtained using a bit stream multiplexer 26 as illustrated in FIG. 1. Specifically, the bit rate of stream S 104 is the summation of the rates of stream S1 100 and stream S2 102 as shown in FIG. 7. The following Pseudo code describes an example implementation of a bit stream multiplexer.

Let S1={(r1(k1), t1(k1)), k1=0, . . . , m1}, S2={(r2(k2), t2(k2)), k2=0, . . . , m2}, then the multiplexed bit stream S=S1+S2={(r(k), t(k)), k=0, . . . , m} can be calculated as follows:

```
k1 = 1                       /* index variable for S1 */
k2 = 1                       /* index variable for S2 */
m = 0                        /* m for S */
r(0) = r1(0) + r2(0)
t(0) = 0
/* at each time point t where r1(t) or r2(t) changes, */
/* calculate r(t) = r1(t) + r2(t) */
While ((k1 ← m1) & (k2 ← m2))
m = m + 1
if (t1(k1) < t2(k2))         /* r1(t) changes first */
t(m) = t1(k1)
r(m) = r1(k1) + r2(k2 - 1)
k1 = k1 + 1
else if (t1(k1) > t2(k2))    /* r2(t) changes first */
t(m) = t2(k2)
r(m) = r1(k1 - 1) + r2(k2)
k2 = k2 + 1
else                         /* both r1(t) and r2(t) change */
t(m) = t2(k2)
r(m) = r1(k1) + r2(k2)
k1 = k1 + 1
k2 = k2 + 1
if (k1 ← m1)                 /* append tail of S1 */
for (k1 = k1; k1 ← m1; k1++)
r(m) = r1(k1) + r2(k2 - 1)
t(m) = t1(k1)
else if (k2 ← m2)            /* append tail of S2 */
for < k2 = k2; k2 ← m2; <k2 ++)
m = m + 1
r(m) = r1(k1 - 1) + r2(k2)
t(m) = t2(k2)
```

Figure 8:
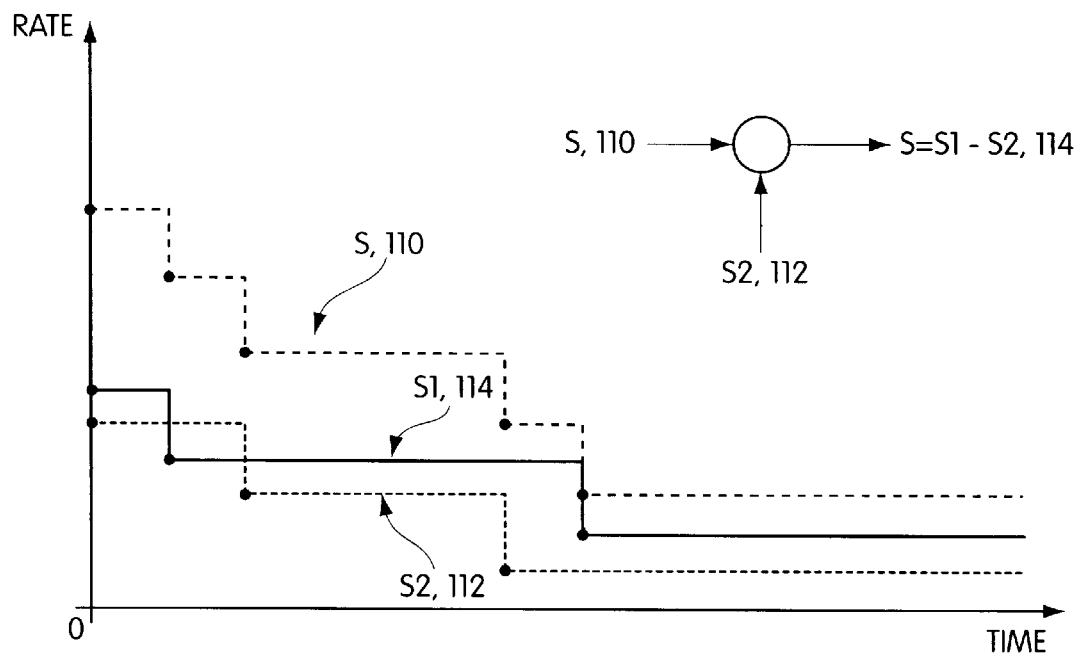
FIG. 8 is a schematic diagram illustrating the demultiplexing of one bit stream from another.

Referring now to FIG. 8, suppose a bit stream S1 110 is aggregated from a bit stream S2 112 and some other bit streams, then a bit stream demultiplexer 28 as illustrated in FIG. 1 can be used to perform the function of removing S2 from S1. Specifically, let bit stream S 114 be the resultant stream of removing S2 from S1, then as shown in FIG. 8, the bit rate of S equals the bit rate of S1 subtracted by the bit rate of S2. The following Pseudo code describes an example implementation of a bit stream demultiplexer.

Let S1={(r1(k1), t1(k1)), k1=0, . . . , m1}, S2={(r2(k2), t2(k2)), k2=0, . . . , m2}, then the demultiplexed bit stream S=S1−S2={(r(k), t(k)), k=0, . . . , m} can be calculated as follows:

```
k1 = 1                       /* index variable for S1 */
k2 = 1                       /* index variable for S2 */
m = 0                        /* m for S */
r(0) = r1(0) - r2(0)
t(0) = 0
/* at each time point t where r1(t) or r2(t) changes, calculate */
/* r(t) = r1(t) - r2(t) */
While ((k1 ← m1) & (k2 ← m2))
m = m + 1
if (t1(k1) < t2(k2))         /* r1(t) changes first */
t(m) = t1(k1)
r(m) = r1(k1) - r2(k2 - 1)
k1 = k1 + 1
else if (t1(k1) > t2(k2))    /* r2(t) changes first */
t(m) = t2(k2)
r(m) = r1(k1 - 1) - r2(k2)
k2 = k2 + 1
else                         /* both r1(t) and r2(t) change */
t(m) = t2(k2)
r(m) = r1(k1) - r2(k2)
k1 = k1 + 1
k2 = k2 + 1
if (k1 ← m1)                 /* append tail of S1 */
for (k1 = k1; k1 ← m1; k1++)
m = m + 1
r(m) = r1(k1) - r2(k2 - 1)
t(m) = t1(k1)
```

Figure 9:
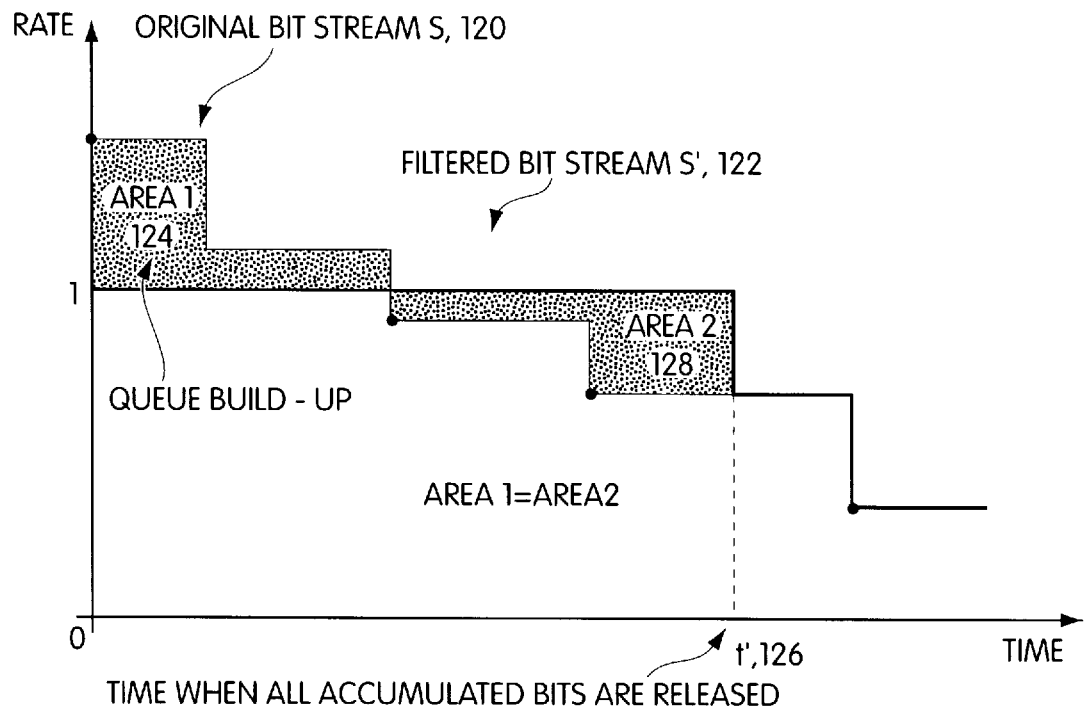
FIG. 9 is a schematic diagram illustrating filtering of a bit stream.

Referring now to FIG. 9, multiplexing of several bit streams may result in an aggregated bit stream S 120 with a bit rate r(t) exceeding the link transmission rate. The outgoing bit stream S' 122 is thus filtered by the outgoing transmission link as shown in the figure. The conversion of an incoming bit stream S={(r(k), t(k)), k=0, . . . , m} to a filtered outgoing bit stream S'={(r'(k'), t'(k')), k'=0, ..., n'} can be performed by a bit stream filter 28 as illustrated in FIG. 1 with the following steps:

Step 1: Calculate the maximum queue buildup during the time period when the incoming bit rate exceeds the outgoing link rate, i.e., when r(t)>1, as shown by AREA1 124 in the figure.

Step 2: Calculate time t' 126 when all accumulated bits are released, i.e., when AREA2 128 equals to AREA 124.

Step 3: Construct a filtered bit stream S' 122 which has a bit rate r'(t)=1 for t ϵ[0, t'), and bit rate r'(t)=r(t) for t≧t'.

The following Pseudo code describes an example implementation of a bit stream filter.

Passing a bit stream S={(r(k), t(k)), k=0,1, ..., m} through a transmission link with bandwidth of 1 cell per cell time results in a filtered bit stream S'={(r'(k'), t'(k')), k'=0, 1, ..., m'} which can be calculated as follows:

```
AREA1 = 0
AREA2 = 0
k = 0                           /* index variable for S */
k' = 0                          /* index variable for S' */
if (r(k) ← 1)
S' = S
else
r'(k') = 1
k' = 1
/* step 1: calculation of maximum queue build-up */
while (r(k) > 1)
AREA1 = AREA1 + (r(k)- 1)*(t(k + 1) - t(k))
k = k + 1
/* step 2: calculation of t', the time when the queue becomes empty */
while (AREA1 < AREA2)
AREA2 = AREA2 + (1 - r(k))*(t(k + 1) - t(k))
k++
t'(k') = t(k) - (AREA2 - AREA1)/(1 - r(k))
r'(k') = r(k)
/* step 3: fill up the rest of S' */
while (k ← m)
k'= k' + 1
r'(k') = r(k)
t'(k') = t(k)
k = k + 1
```

Figure 10:
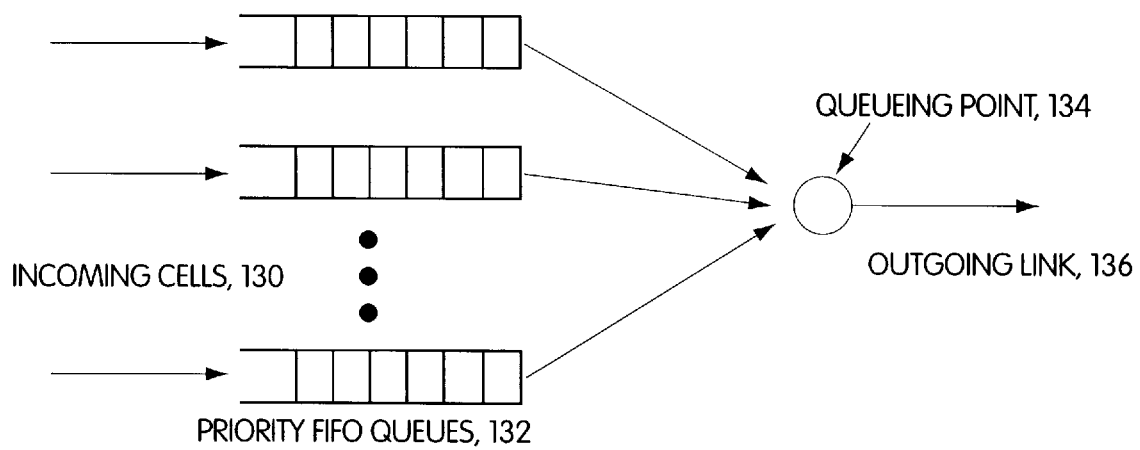
FIG. 10 is a schematic diagram illustrating a static priority FIFO cell queueing and transmission scheduling mechanism used in an ATM switch.

Referring now to FIG. 10, the way in which a switch uses a queue and schedule transmission of incoming cells directly affect a switch's ability of providing QoS guarantees to connections. Sophisticated queueing and scheduling schemes like per-VC queueing and deadline scheduling allow a switch to provide different QoS guarantees for each individual connections. In the subject invention, however, a commonly used static priority First-In-First-Out (FIFO) queueing and scheduling scheme is assumed to ensure the applicability of the subject invention to existing ATM networks. Specifically, with a static priority FIFO scheduling mechanism, incoming cells 130 of one connection are stored, in one of the priority FIFO queues 132. Cells stored in a higher priority queue are always sent before those in a lower priority queue. Within the same queue, cells are sent in the same order as they are deposited into the queue. With this queueing mechanism, connections of the same priority have the same queueing delay bound at the queueing point 134 of an outgoing link 136.

Figure 11:
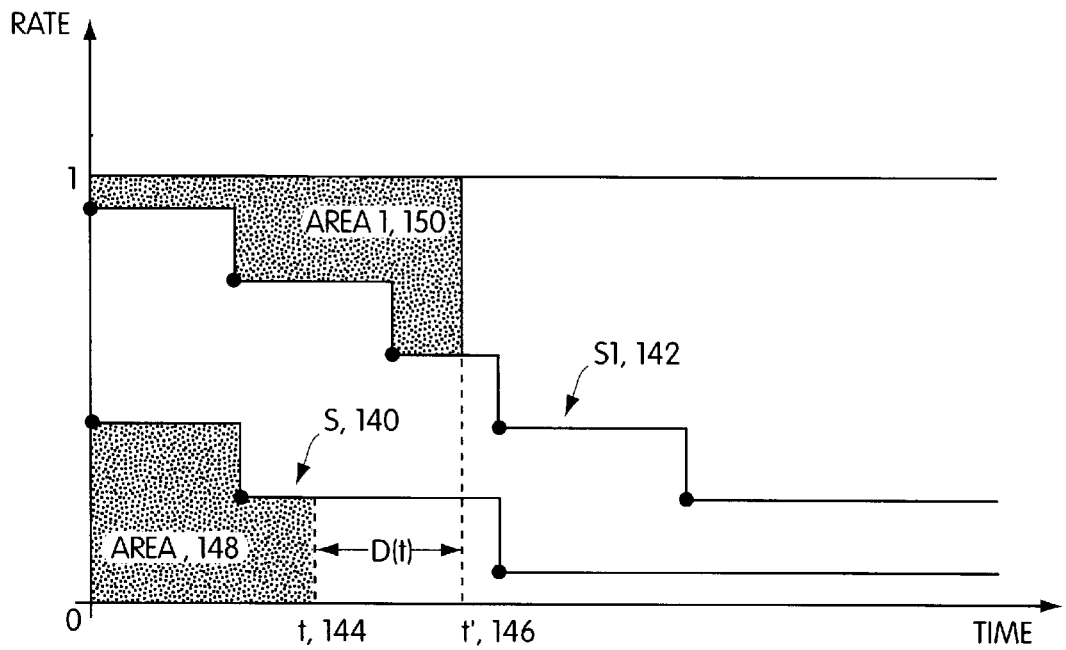
FIG. 11 is a schematic diagram illustrating a mechanism used to calculate the worst-case queueing delay.

Referring now to FIG. 11, with the cell queueing and scheduling mechanism as shown in FIG. 10, the maximum queueing delay bound for a connection can be obtained using a queueing delay generator 30 as illustrated in FIG. 1. Specifically, let S 140 be the aggregated bit stream of priority level p, and let S1 142 be the filtered aggregated bit stream of priority levels higher than p, then the maximum queueing delay for S can obtained with the following steps:

Step 1: For each time point t 144, find corresponding time t' 146 such that AREA 148 is equal to AREA 150 as shown in FIG. 11.

Step 2: Let D(t)=t'-t. Then the maximum queueing delay for S equals max{D(t), t≧0}.

Since the bit rates of both S and S1 change only at a finite number of time points, the maximum delay can be obtained with a finite number of operations. The following Pseudo code gives an example implementation of the above described queueing delay generator.

Let S={(r(k),t(k)), k=0, ..., m} be the aggregated bit stream of priority p and S1={(r1(k1),t1(k1), k1=0, ..., m1} be the filtered aggregated bit stream of priorities above p, then the maximum queueing delay for S can be calculated as follows:

```
D = 0                           // queueing delay
k = 0                           // index for S
k1 = 0                          // index for S1
AREA = 0
AREA1 = 0
while (r(k) > 1 - r1(k1)) {     // no need to check D(t) otherwise
AREA = AREA + r(k)*t(k + 1) - t(k))
// now find t' for t = t(k)
while ((AREA > AREA1) & (r(k) > (1 - r1(k1))) & (k1 < m1))
AREA1 = AREA1 + (1 - r1(k1))*(t1(k1 + 1) - t1(k1))
k1 = k1 + 1
if (AREA ← AREA1)               // update t' and D
t' = t1(k1) - (AREA1 - AREA)/(1 - r1(k1 - 1))
k = k + 1
D = t' - t(k)
else                            // either r(k) ← r1(k1) or k1 = m1
k = k + 1
t = t(k) - (AREA- AREA1)/r(k - 1)
D = t1(k1) - t
break                           // maximum D found
```

Figure 12:
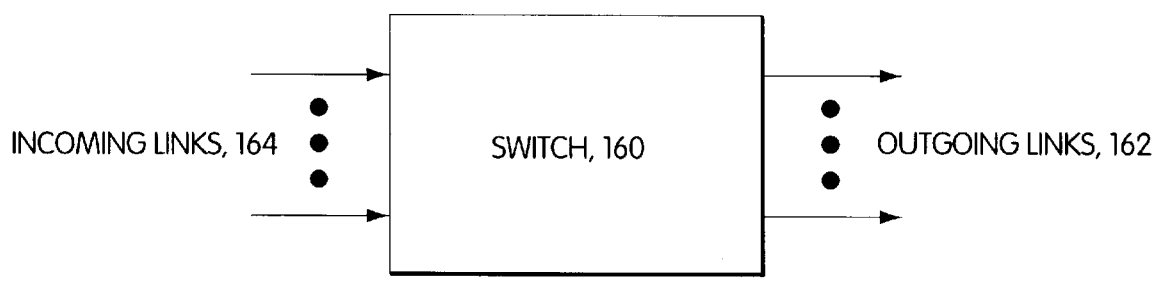
FIG. 12 is a schematic diagram illustrating the incoming and outgoing links of an ATM switch.

Referring now to FIG. 12, for each switch 160 in a network, a connection database 16 shown in FIG. 1 provides the following connection information:

● Traffic and QoS parameters for each connection established through the switch: (PCR, SCR, MBS, CDV, D), where PCR is the peak cell rate, SCR is the sustainable cell rate, MBS is the maximum burst size, CDV is the accumulated cell delay variance from a connection's source to the switch, and D is the requested end-to-end queueing delay bound.

● For each pair of incoming link i and outgoing link j, and each priority level p of outgoing link j, store the following bit streams:

S_ia(i,j,p): the aggregated bit stream of all connections of priority level p coming in from incoming link i and going out from outgoing link j S_ia(i,j)(p): the aggregated bit stream of all connections of priority levels higher than p coming in from incoming link i and going out from outgoing link j S_if(i,j,p): filtered bit stream of S_ia(i,j,p)

S_if(i,j)(p): filtered bit stream of S_ia(i,j)(p)

S_oa(j,p): aggregated bit stream of S_if(i,j,p) over all incoming links

S_oa(j)(p): aggregated bit stream of S_if(i,j)(p) over all incoming links

The memory needed to store these data structures is proportional to the total number of connections times the number of priority levels.

Figure 13:
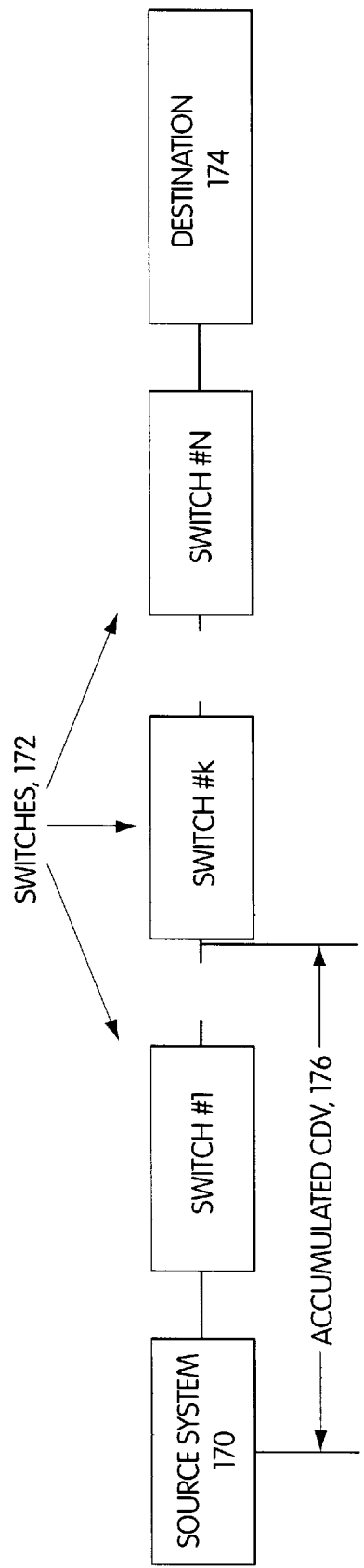
FIG. 13 is a schematic diagram illustrating the route of a connection over multiple ATM switches.

Referring now to FIG. 13, suppose a connection starts from a source system 170, goes through N switches 172, and ends at a destination system 174. Switch k provides a maximum queueing delay bound D(k) for the connection, k=1, . . . , N. Let p be the transmission priority of the connection at switch k and let CDV 176 be the accumulated cell delay variance from its source to the input link of switch k. Then the processing of a connection request with parameters (PCR, SCR, MBS, D) can be performed with the following steps:

Step 1: If D(1)+D(2)+. . . +D(N)>D, stop. The end-to-end queueing delay bound D can not be provided over the selected route. A connection reject message is sent back to source system 170. Otherwise, initialize k=1 and set CDV equal to the cell delay variance introduced by the source system and goto Step 2.

Step 2: Check if the connection can be established at the switch without affecting the switch's queueing delay bound guarantees to priority p and lower (priority levels higher than p are not affected by the new connection) using procedures illustrated in FIG. 14. If the check fails, stop. A connection reject message is sent back to source system 170. Otherwise, goto Step 3.

Step 3: If k=N and the destination system 174 also accepts the connection, send a connection accepted message to source system 172 and update connection database to reflect the addition of the connection. Otherwise, update CDV=CDV+D(k), k=k+1, and go back to Step 2.

In Step 3 above, the cell delay variance CDV of a connection is accumulated as the summation of delay bounds D(k) of switches on the route. This is to perform the worst-case queueing analysis to ensure a hard guarantee on the queueing delay bound. For a connection requiring only soft delay bound guarantees, CDV accumulation can be performed in a less stringent way such as square root summation of switch delay bounds so that more connections can be established over a network.

It should be noted that the above described connection admission control system can be implemented either in a centralized server or distributedly at switches.

Figure 14:
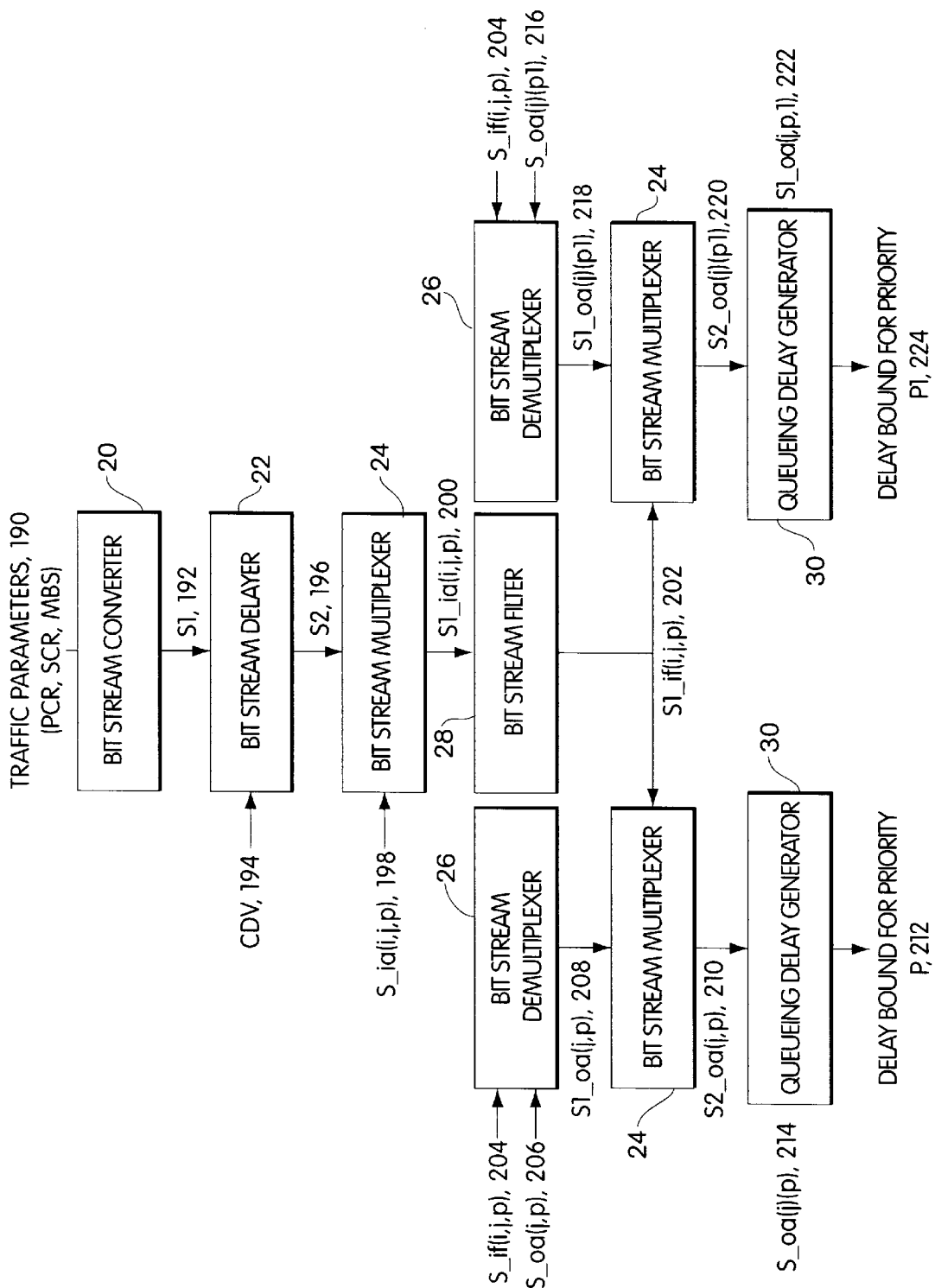
FIG. 14 is a schematic diagram illustrating the procedures of determining cell queueing delay bounds.

Referring now to FIG. 14, determination of whether or not the addition of a new connection of priority p affects the delay bound guarantee to priority p at a switch can be performed as follows. Let i and j be the incoming and outgoing links of the connection, respectively. Traffic parameters 190 of the connection, i.e., PCR, SCR, and MBS, are inputted to a bit stream converter 20 to obtain a bit stream S1 192 which describes the worst-case traffic generation pattern of the connection. Bit stream S1 192, together with the accumulated cell delay variance CDV 194 of the connection at the input link of the switch are inputted to a bit stream delayer 22 to obtain a bit stream S2 196 which describes the worst-case traffic arrival pattern of the connection at the switch. Bit stream S2 196 is then multiplexed with S_ia(i,j,p) 198, which is the aggregated bit stream of all existing connection with the same input/output links and priority level as the connection to be establish, using a bit stream multiplexer 24 to produce a new aggregated bit stream S1_ia(i,j,p) 200. This new aggregated bit stream is then filtered by a bit stream filter 28 to produce a new filtered bit stream S1_if(i,j,p) 202. On the other hand, the original filtered bit stream S_if(i,j,p) 204 of S_ia(i,j,p) 198 is demultiplexed from the aggregated bit stream S_oa(j,p) 206 of the outgoing link using a bit stream demultiplexer 26 to produce a bit stream S1_oa(j,p) 208. Bit stream S1_oa(j,p) 208 is then multiplexed with bit stream S1_if(i,j,p) 202 using a bit stream multiplexer 24 to produce a new aggregated bit stream S2_oa(j,p) 210 after the addition of the connection. Finally, a new queueing delay bound 212 for priority p is obtained from bit stream S2_oa(j,p) 210 and bit stream S_oa(j)(p) 214 by using a queueing delay generator 30. This new maximum queueing delay 212 is compared to the switch's delay bound to determine if priority p is affected by the new connection.

Referring now again to FIG. 14, determination of whether or not the addition of a new connection of priority p affects the delay bound guarantee to a lower priority p1 at the switch can be performed as follows. The bit stream S_if(i,j,p) 204 is demultiplexed from the aggregated bit stream S_oa(j)(p1) 216 of the outgoing link using a bit stream demultiplexer 26 to produce a bit stream S1_oa(j)(p1) 218. Bit stream S1_oa(j)(p1) 218 is then multiplexed with bit stream S1_if(i,j,p) 202 using a bit stream multiplexer 24 to produce a new aggregated bit stream S2_oa(j)(p1) 220 after the addition of the connection. Finally, a new maximum queueing delay 224 for priority p1 is obtained from bit stream S2_oa(j)(p1) 220 and bit stream S_oa(j,p1) 222 by using a queueing delay generator 30. This new maximum queueing delay 224 is compared to the switch's delay bounds to determine of priority p1 is affected by the new connection.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In an ATM network, a connection admission control system for setting up a connection to transfer cells from source to a destination over said network which guarantees user-requested end-to-end cell transmission delay bounds, comprising:

a number of queuing points associated with said connection, each queuing point having a delay associated therewith dependent upon arriving traffic at said queuing point;

means at said queuing point for providing a bit stream that describes a worst case for said traffic at said queuing point thereby to provide a worst case description;

means at said queuing point for calculating the associated delay based on said worst case description for said traffic at said queuing point, thus to establish a worst case end-to-end transmission delay bound for said connection; and, means responsive to said calculated delay for determining whether or not said connection can be established.

2. The admission control system of claim 1, wherein said connection is a CBR/VBR connection and wherein said means for providing said bit stream includes means for describing the worst case traffic parameters of a CBR/VBR connection for traffic at said queuing point.

3. The admission control system of claim 2, wherein said means for providing said bit stream includes means for generating a new bit stream after the one associated with said worst case description is delayed, multiplexed, demultiplexed, or filtered within the said network.

4. The system of claim 1 and further including means for altering said worst case bit stream if said calculated delay does not meet said user-requested delay bound.

* * * * *